United States Patent [19]
Öberg

[11] Patent Number: 5,711,634
[45] Date of Patent: Jan. 27, 1998

[54] ARRANGEMENT FOR A BOOM

[75] Inventor: Per Olof Öberg, Nordmaling, Sweden

[73] Assignee: Expandi Systems AB, Sweden

[21] Appl. No.: 560,041

[22] Filed: Nov. 17, 1995

Related U.S. Application Data

[63] Continuation-in-part of Ser. No. 211,121, Mar. 21, 1994, Pat. No. 5,511,906.

[51] Int. Cl.$^6$ ................................................. E02B 15/04
[52] U.S. Cl. .......................................... 405/66; 405/63
[58] Field of Search ................. 405/63–72; 210/242.3, 210/923

[56] References Cited

U.S. PATENT DOCUMENTS

| | | | |
|---|---|---|---|
| 4,068,478 | 1/1978 | Meyers et al. | 405/63 |
| 4,295,755 | 10/1981 | Meyers | 405/63 |
| 4,741,089 | 5/1988 | Öberg | 405/66 |
| 5,020,940 | 6/1991 | Smith | 405/63 |
| 5,197,821 | 3/1993 | Cain et al. | 405/66 X |

FOREIGN PATENT DOCUMENTS

| | | |
|---|---|---|
| 57-68413 | 4/1982 | Japan . |
| 344088 | 2/1972 | Sweden . |
| 452897 | 12/1987 | Sweden . |
| 1416978 | 12/1975 | United Kingdom . |

*Primary Examiner*—Dennis L. Taylor

[57] ABSTRACT

An arrangement for a boom for confining and collecting escaped oil, or the like, having a tubular casing and a shield part attached thereto. A plurality of spaced dividing walls are disposed within the tubular casing. The tubular casing is movable between a collapsed rest position and an expanded operational position. Expansion devices are attached to the tubular casing and are movable between a folded position and an unfolded position. Biasing members are attached to the expansion devices for urging the expansion devices into the unfolded position so that the tubular casing is moved into the expanded position. A valve is operatively attached to the tubular casing so that air may flow into the tubular casing through the valve when the tubular casing is expanded. An impervious flexible sheet material has a mid-portion and opposite side edges sealingly attached to one another so that the bottom end portions form an opening. A first chamber is defined by the sheet material and the chamber is open downwardly so that air may fill the chamber when the tubular casing is in the expanded position to provide buoyancy of the boom even when the boom is damaged.

11 Claims, 2 Drawing Sheets

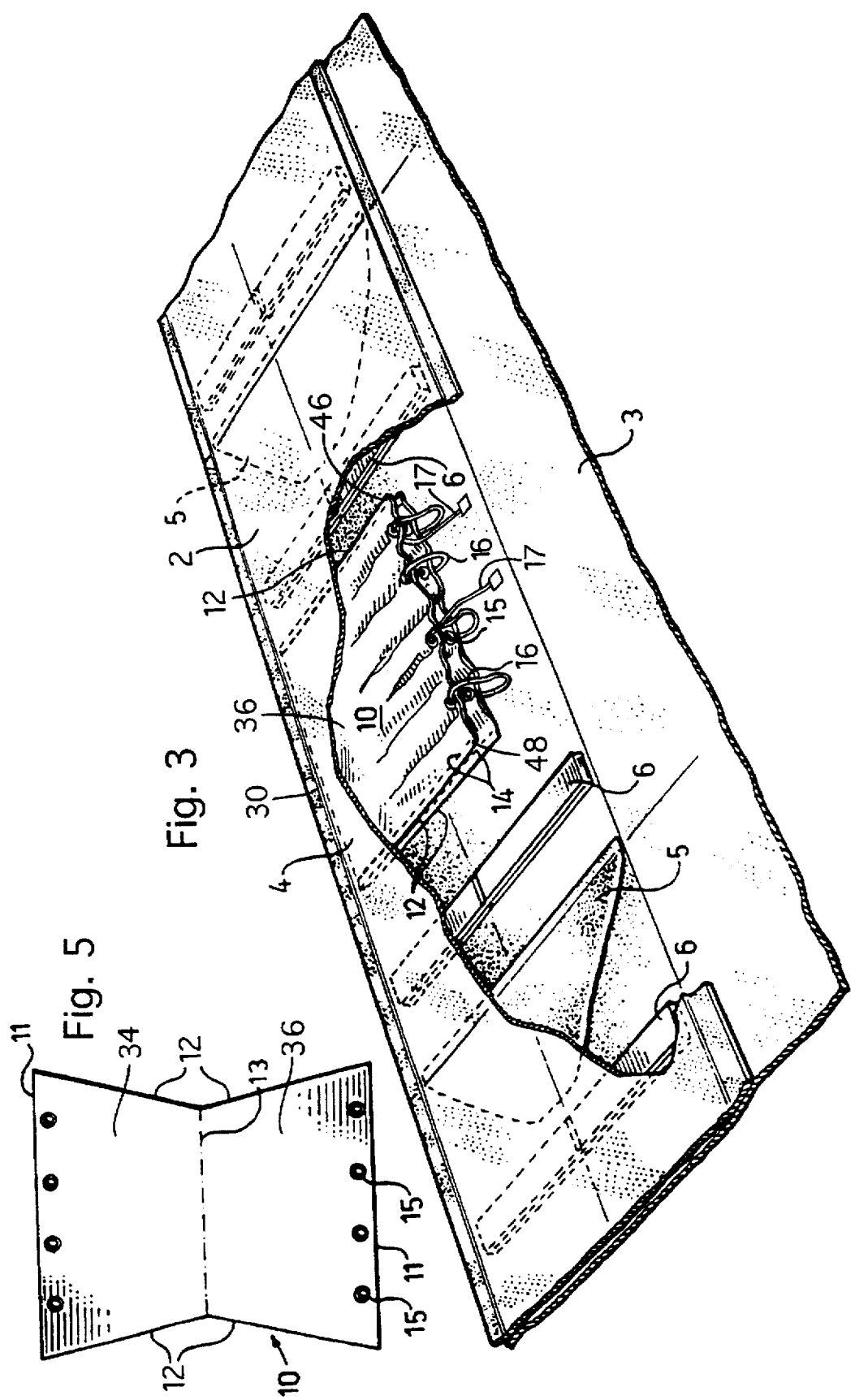

ARRANGEMENT FOR A BOOM

PRIOR APPLICATION

This is a continuation-in-part application of U.S. application Ser. No. 08/211,121 filed on 21 Mar., 1994, now U.S. Pat. No. 5,511,906.

TECHNICAL FIELD

This invention relates to a boom device used for containing oil and other similar floating materials or substances that may have escaped into the sea, lakes and other waterways. The boom has a floating part and a shield part arranged beneath the floating part.

BACKGROUND INFORMATION AND SUMMARY OF THE INVENTION

In a previously disclosed boom arrangement, the supporting part consists of a collapsible and extensible hose-like unit made of a soft but durable woven and/or film material. Inside the unit a row of expansion devices are arranged and fitted with spring devices that are in tension to attempt to unfold the unit. The hose-like unit is impervious, but is equipped at its uppermost part with valves through which air is permitted to flow in and flow out respectively at the time of unfolding and collapsing of the unit. Adjacent to the supporting part is the shield part, which is fitted at its lower edge with ballast weights or similar, which contribute to the lateral stabilization of the arrangement as a whole.

It has been found that booms of the previously disclosed kind, irrespective of whether they are subdivided into separate chambers by means of transverse walls, are capable, if they are involved in a collision in conjunction with which the material of the outer casing of the floating part is damaged, or losing so much buoyancy as a result of the inflow of water that they will sink either partially or completely. Apart from the fact that a completely or partially submerged boom is unable to perform its task of containing oil or similar substances, the work of recovery is both difficult and costly. One object of the present invention is to make available an arrangement which, as far as possible, will prevent submersion even if the material of the hose-like outer casing is damaged in such a way that its imperviousness is lost.

The present invention is based largely on existing types of booms and exhibits a similar function in all essential respects. One requirement imposed on the design of the arrangement in accordance with the present invention is that the boom executed in accordance with the present novel arrangement should not differ from the previously disclosed arrangement with regard to their handling and the volume occupied in the rolled-up form.

It follows from this that ideas such as the arrangement of internal buoyancy bodies and similar could be dismissed immediately, since they would have caused the thickness of the rolled up casing to increase significantly, and with it the external dimensions of the boom rolls, if the same boom length were to be retained.

The desired emergency buoyancy is obtained by the boom arrangement of the present invention by a chamber defined between a first and a second flexible member disposed inside the boom. For example, a chamber is disposed in each section separated by dividing walls, and by the execution of these in such a way that they fill with air automatically at the same time as the boom is expanded. Even if the material of the casing becomes torn along part of the section, so that the air leaks out and the buoyancy of the boom section is reduced, the air remaining in the chambers will still provide sufficient buoyancy. The chambers are so dimensioned that they will provide sufficient buoyancy to prevent total submersion, even if the material of the casing were to be damaged or torn to pieces.

One of the distinctive design features which characterize the novel arrangement of the present invention is the chamber formed by weldable pieces of woven or film material, which have substantially parallel end edges but the side edges are cut essentially into the form of a 'V', in which the part of the material with the smallest width is so arranged as to be welded to that part of the boom casing which forms its back or top, and the angle-cut sides are so arranged as to be weldable essentially at right angles to the longitudinal direction of the boom, the consequence of which is that the free edges of the woven or film material, which, because of the angles nature of the cutting, are longer than the distance between the essentially parallel side welds, may be folded or coiled when in the collapsed state and as such do not obstruct the rolling-up of the boom, although they are present at all times as a safety measure. More specifically, the side edges of the present invention are welded to one another so that a first chamber is formed inside the film material to provide sufficient buoyancy even if the boom is damaged. A second chamber may be formed between the film material and the inside wall of the boom casing.

BRIEF DESCRIPTION OF THE DRAWINGS

FIG. 3 is a perspective view of the boom in a collapsed position.

FIG. 5 is a side view of the flexible material placed inside the boom of the present invention.

DETAILED DESCRIPTION

Figure 1:
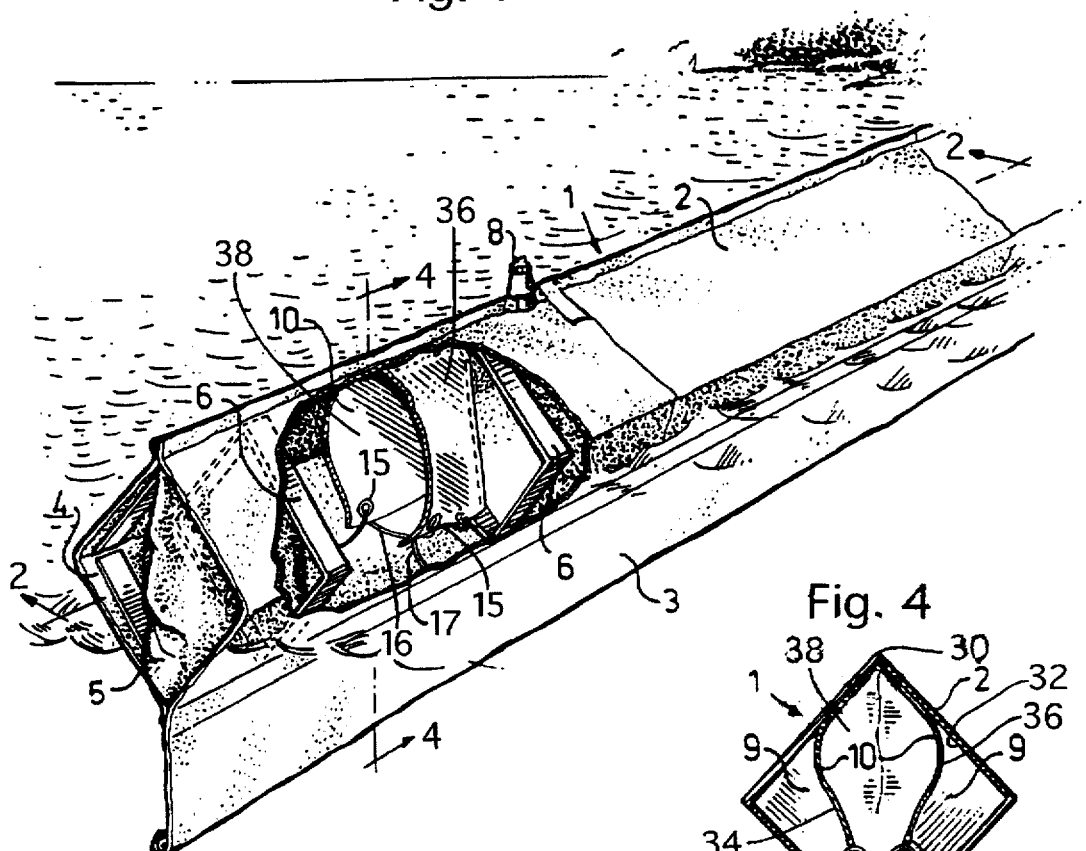
FIG. 1 is a perspective view of the boom of the present invention in an expanded operational position.
Figure 4:
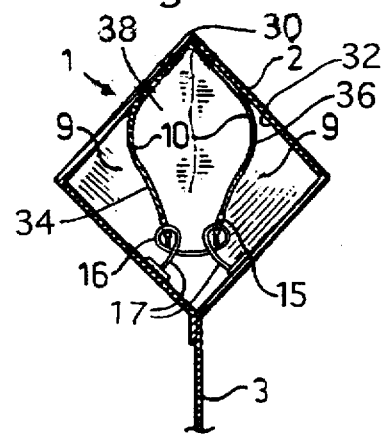
FIG. 4 is a cross sectional view of the boom along line B—B of FIG. 1.
Figure 2:
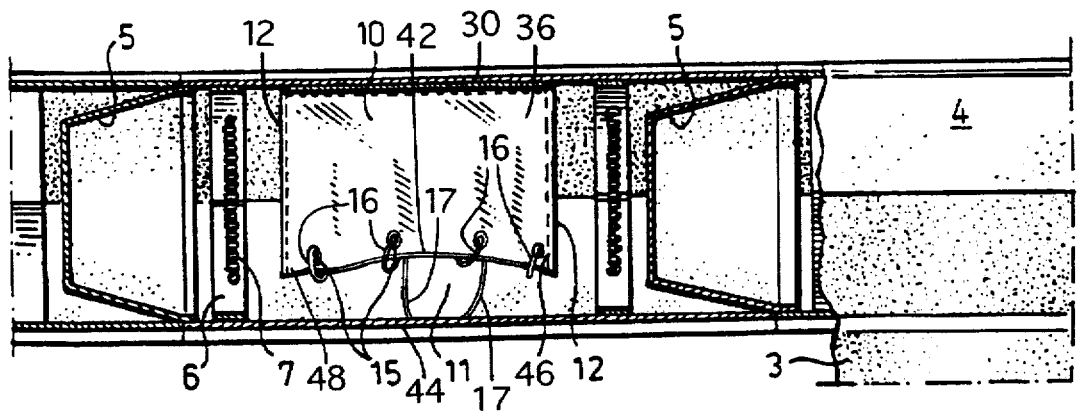
FIG. 2 is a side view of a portion of the inside of the boom.

With reference to FIGS. 1–5, the boom 1 of the present invention includes a supporting part 2 and a shield part 3 attached to a lower edge of the supporting part 2. The shield part 3 may be mechanically fastened to the supporting part or glued thereto. The shield part 3 may also be welded to the supporting part 2.

The supporting part 2 may be formed by a rectangular shaped casing 4 made of a reinforced plastic material that is welded together in a watertight fashion. The casing 4 includes dividing walls or bulkheads 5 that are placed inside the casing and longitudinally spaced apart. The bulkheads 5 may also be made of a reinforced plastic material or another suitable material. The casing 4 is movable between a collapsed rest position and an expanded operational position. When the casing is in the rest position (best shown in FIG. 3) the bulkheads lay down flat along an inside wall of the casing. An important feature of the present invention is that the casing is coilable when it is in the collapsible position. When the casing 4 is in the operational position, the bulkheads are substantially perpendicular to the longitudinal axis of the casing and form conical dividing walls inside the casing 4. The bulkheads 5 divide the casing 4 of the boom 1 into a plurality of mutually separate sections.

Inside the casing 4 is also a number of devices 6 equipped with tension springs 7 that urge the casing 4 into the operational position and cause air to be sucked in through air valves 8 at the top of the casing 4 to compensate for the low pressure in the casing as the casing is folded into the expanded position. The tension springs 7 provide a sufficient biasing force to overcome the external pressure that urges the casing into the collapsed position.

Pocket-like emergency buoyancy arrangements are disposed in accordance with the present invention inside the boom casing. These consist of impervious woven or film material parts 10 attached in such a way to the casing 4 that a first downwardly open chamber 38 is defined within the casing when the casing is in the expanded operational position. The emergency buoyancy arrangements may conveniently be provided within each section confined by the dividing walls 5.

The first chamber 38 is formed by the impervious woven or film material 10 that are arranged opposite one another in pairs on the inside of the casing 4. The chamber 38 is formed by the sheet material 10 (best shown in FIG. 5) having substantially parallel end edges 11 and side edges 12 having a V-shaped incision at a narrowest mid-section 13 at the center of the sheet material 10. The sheet material is foldable at the mid-section 13 and operatively attached to longitudinal strips at a highest point 30 of an inside wall 32 of the casing 4 so that the film material hang downwardly from the highest point. A portion of the film material may be attached along mutually parallel strips 14 on the inside wall 32 of the casing 4. In the preferred embodiment, the sheet material 10 is folded and attached at the mid-section 13 to the highest point 30 of the casing 4 so that a first flexible sheet 34 and a second flexible sheet 36 extend downwardly from the highest point 30. The side edges 12 of flexible sheet 34 are sealingly attached to the side edges of flexible sheet 36. The first chamber 38 is thus formed between the flexible sheets 34, 36. A second chamber 9 may be formed between the outside of the flexible sheets 34, 36 and the inside wall 32 of the casing 4.

The parallel strips 14 are substantially perpendicular to the longitudinal strips at the highest point 30. The distance between the strips 14 is substantially the same as the length of the mid-section 13. The end edges 11 of the sheet material 10 may be free hanging and not attached to the inside wall 32 of the casing 4. The end edges may be slightly curved when the boom is in the expanded position. The distance between the strips 14, and thus the length of mid-section 13, are slightly less than the length of the end edges 11 so that the end edges are flaccid or curved when the casing is in the collapsed position. In the preferred embodiment, the end edges are slightly curved when the casing is in the expanded position so that a mid-point 42 is remote from a lowest section 44 of the casing 4. When the casing is in the expanded position, the mid-point 42 is more remote from the lowest section 44 than corner points 46, 48 are from the lowest section 44.

The end edges 11 have a plurality of openings defined therethrough and fasteners 15 attached thereto. A plurality of connecting members or strings 16 are attached by the fasteners and extend between the lower edges of the flexible sheets 34, 36. The connecting strings 16 may be used to control the distance between the flexible sheets 34, 36 and thus the size of the opening into the chamber 38. A plurality of bendable control members or strings 17 may be operatively attached to the inside wall 32 and to the fasteners 15 and/or the connecting strings 16 to ensure that the flexible sheets 34, 36 are separated when the boom is in the expanded position so that air may enter into the chamber 38.

If the boom of the present invention is involved in a collision or is otherwise damaged so that the casing 4 is damaged or torn apart, water may enter into the casing 4 and displace the air therein. In a conventional boom, the damaged and water-filled section would sink and drag down adjacent sections. If several sections were to become damaged, parts of the boom or, in the worst case, the whole boom may sink. Because the chamber 38 will remain in the casing arranged in accordance with the present invention, even in an otherwise water-filled section, sufficient buoyancy is provided to ensure that the boom remains well above the surface of the water. If the casing 4 is torn only beyond the position of the sheet material that forms the second chambers 9, and if the chamber on the damaged side is also functioning, the buoyancy will be even better.

The present invention provides a boom that, when in the rolled up position, is easy to manage and is not thicker than conventional booms, and when in the operational position, is buoyant even if a portion of the boom is damaged.

While the present invention has been described in accordance with the preferred embodiment, it is to be understood that certain substitutions and alterations may be made thereto without departing from the spirit and scope of the claims. I claim all such modifications which fall within the following claims.

I claim:

1. A buoyant boom comprising:
    an elongate tubular casing having an inside wall, the tubular casing being movable between a collapsed rest position and an expanded operational position, the tubular casing having an upper portion and a lower portion;
    a plurality of spaced dividing walls disposed within the tubular casing, the dividing walls being made of a flexible material;
    an elongate shield part attached to the tubular casing;
    expansion devices attached to the tubular casing, the expansion devices being movable between a folded position and an unfolded position;
    biasing members attached to the expansion devices, the biasing members urging the expansion devices into the unfolded position so that the tubular casing is moved into the expanded operational position;
    a valve operatively attached to the upper portion of the tubular casing so that air enters the tubular casing through the valve when the tubular casing is moved from the collapsed rest position to the expanded operational position and air exits the tubular casing through the valve when the tubular casing is collapsed by urging the biasing members into the folded position, the tubular casing being made of a flexible material so that the casing is coilable when in the collapsed rest position;
    an impervious flexible sheet material disposed inside the tubular casing, the sheet material being folded at a mid-portion thereof and attached to an upper portion of the inside wall of the casing so that a first and a second flexible member extend downwardly from the inside wall of the tubular casing when the tubular casing is in the expanded position, the flexible members having opposite side edges, the side edges of the first flexible member being attached to the side edges of the second flexible member; and
    a first chamber defined inside the first and second flexible members so that air fills the first chamber when the tubular casing is moved into the expanded position to provide buoyancy of the boom.

2. The buoyant boom of claim 1 wherein a second chamber is defined between the flexible members and the inside wall of the tubular casing, the second chamber is open downwardly so that air fills the second chamber between the tubular casing and the flexible members of the sheet material when the tubular casing is moved into the expanded position to provide buoyancy of the boom.

3. The buoyant boom of claim 1 wherein the side edges of the first flexible member is sealingly attached to the side edges of the second flexible member.

4. The buoyant boom of claim 1 wherein the flexible members have free end edges that are remote from the mid-portion of the sheet material and connected to one another by connecting members.

5. The buoyant boom of claim 4 wherein the free end edges are curved when the tubular casing is in the expanded position.

6. The buoyant boom of claim 4 wherein the free end edges are curved when the tubular casing is in the collapsed position.

7. The buoyant boom of claim 4 wherein the inside wall has a lower end that is remote from the mid-portion and a control member is attached to the connecting members and the lower end of the inside wall.

8. The buoyant boom of claim 7 wherein the control member is bendable.

9. The buoyant boom of claim 7 wherein the flexible members have free end edges and the control member separates the free end edge of the first flexible member from the free end edge of the second flexible member.

10. A boom according to claim 4 wherein, the flexible sheet material is made of a continuous material and is foldable and the mid-portion has a length that is less than a length of the free end edges so that the side edges of the flexible sheet material are V-shaped when the sheet material is unfolded, the tubular casing has an uppermost portion at the inside wall, the midportion of the sheet material is sealingly attached to the uppermost portion of the inside wall of the tubular casing, the inside wall of the tubular casing has a plurality of axially spaced apart strips that are perpendicular to the longitudinal axis of the tubular casing, the strips are spaced apart a distance from one another that is less than the length of the free end edges so that the free end edges of the flexible sheet material are flaccid when the tubular casing is in the collapsed position.

11. A boom according to claim 10, wherein the flexible sheet material is made of a soft woven material and is imperviously attached to the inside wall of the tubular casing.

* * * * *